(12) United States Patent
Arthur et al.

(10) Patent No.: US 9,065,972 B1
(45) Date of Patent: Jun. 23, 2015

(54) USER FACE CAPTURE IN PROJECTION-BASED SYSTEMS

(71) Applicant: Rawles LLC, Wilmington, DE (US)

(72) Inventors: Kevin Wayne Arthur, San Jose, CA (US); Menashe Haskin, Palo Alto, CA (US)

(73) Assignee: Rawles LLC, Wilmington, DE (US)

( * ) Notice: Subject to any disclaimer, the term of this patent is extended or adjusted under 35 U.S.C. 154(b) by 112 days.

(21) Appl. No.: 13/789,231

(22) Filed: Mar. 7, 2013

(51) Int. Cl.
*H04N 7/14* (2006.01)
*H04N 7/15* (2006.01)

(52) U.S. Cl.
CPC ........................................ *H04N 7/15* (2013.01)

(58) Field of Classification Search
CPC ......... H04N 7/14; H04N 7/141; H04N 7/142; H04N 7/144; H04N 7/15
USPC ................................. 348/14.08, 14.15, 14.16
See application file for complete search history.

(56) References Cited

U.S. PATENT DOCUMENTS

| | | | |
|---|---|---|---|
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2009/0046139 | A1* | 2/2009 | Cutler et al. ................ 348/14.08 |
| 2010/0188478 | A1* | 7/2010 | Robinson et al. ........... 348/14.16 |
| 2010/0253761 | A1* | 10/2010 | White ......................... 348/14.16 |
| 2012/0077172 | A1* | 3/2012 | Watanabe et al. .............. 434/308 |
| 2012/0081611 | A1* | 4/2012 | Tan et al. ....................... 348/584 |
| 2012/0223885 | A1 | 9/2012 | Perez |
| 2012/0274727 | A1* | 11/2012 | Robinson et al. ........... 348/14.07 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Quoc D Tran
(74) *Attorney, Agent, or Firm* — Lee & Hayes, PLLC

(57) ABSTRACT

A projector based user interface unit is described for implanting an interactive workspace. The interface unit projects a graphical workspace onto a display surface and monitors user interactions with the workspace. A mirror is placed on or near the workspace to reflect the face of the user to the interface unit. The interface unit captures the mirrored face of the user and provides images of the face of the user to other users for use in conjunction with collaborative techniques such as video conferencing or content sharing.

21 Claims, 3 Drawing Sheets

USER FACE CAPTURE IN PROJECTION-BASED SYSTEMS

BACKGROUND

Widespread availability and adoption of wide-area networking technologies have made it possible for users who are in different locations to collaborate using shared resources. A common technique for collaboration involves sharing common visual content between the computers of multiple users. For instance, a document or other presentation may be displayed simultaneously on the computer displays of the multiple users. Audio and/or video conferencing may be used in conjunction with this type of collaboration so that the users may discuss aspects of the displayed content.

In many cases, the users can interact by editing or otherwise manipulating the displayed content as it is displayed. Such user activity is typically visible in real time to the other participating users. In addition, one or more users may move a cursor or other pointer relative to the shared content, and the cursor is visible to all participants. Real-time video of the users' faces may also be displayed in conjunction with the shared content in order to enhance interactions between users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for multi-user collaboration, in which images of the faces of individual users are displayed on the workspaces of other users. The systems and techniques may be used in conjunction with workspace or content sharing, video conferencing, and other collaborative activities.

More specifically, the systems and technique include the use of a projection-based user interface, in which an interactive workspace is created by projecting content onto a passive surface such as a tabletop, wall or other display media.

The projection-based user interface may be created by a user interface unit having a projector and one or more imaging sensors. The projector is used to project an image of a graphical workspace onto a display surface. The imaging sensors are used to monitor user interactions with the projected workspace.

The user interface unit works in conjunction with a mirror, which is positioned near the projected workspace. The user interface unit uses its imaging sensors to detect the mirror and to capture images of the mirror. Images of the face of the user are extracted from the mirrored images and transmitted for display by other user interfaces that are associated with other users.

The mirror may in some embodiments comprise a planar reflective surface that can be appropriately positioned and physically adjusted by the user for proper alignment with the user interface unit. In other embodiments, the mirror may comprise a non-planar surface designed to have a wide or encompassing field of view, thereby reducing the need for physical adjustment or placement of the mirror. In certain embodiments, the mirror may have multiple facets, oriented in different directions, to reflect different areas of the user environment to the user interface unit.

Figure 1:
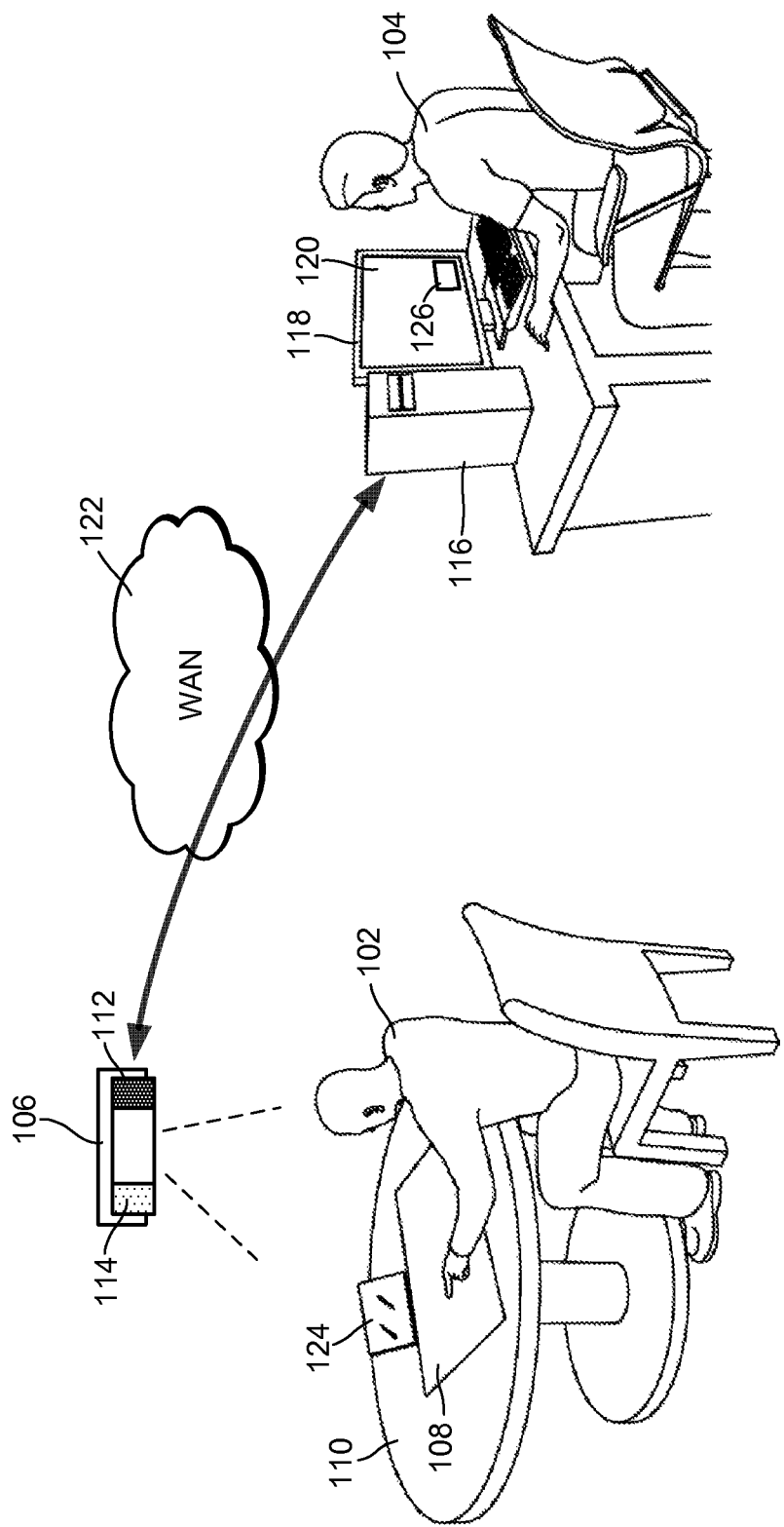
FIG. 1 illustrates an environment in which multiple users collaborate with respect to content that is shared and displayed concurrently on respective display surfaces, and in which at least one of the users views the shared content on a projected workspace.

FIG. 1 shows an example environment in which the described techniques may be implemented. The environment includes first and second users 102 and 104, who may be located at geographically remote locations, and who collaborate by sharing visual content. For purposes of discussion, the first user may be referred to as a local user, and the second user may be referred to as a remote user.

The environment of the first user 102 includes a user interface unit 106, which is configured to create an interactive visual workspace 108 on an otherwise passive surface 110. The passive surface 110 comprises a tabletop in this example.

The user interface unit 106 may in certain embodiments comprise a computer or computer-like device, such as a personal computer, a game console, a media device, a teleconferencing system, a communications device, and so forth. Rather than having a traditional active display device, however, the user interface unit 106 is configured to project the workspace 108 onto a suitable passive surface and to detect interactions by the user 102 with the workspace 108 by detecting placement and movement of the hands of the user relative to the workspace 108. The user 102 may interact with the workspace 108 and with the interface unit 106 by placing or moving their hands and fingers relative to the workspace 108. For example, the user 102 may touch the surface 110 at a particular location to select an element of the workspace 108 that is displayed at that location. Other motions and gestures may be used to move, select, provide input, or to otherwise manipulate workspace elements and/or interact with the workspace 108. The user interface unit 106 may additionally accept voice input.

In other embodiments, the user interface unit 106 may comprise an interface to a separate computer or other automated system. For example, the user interface unit 106 may be used in conjunction with a computer, computer-like device, or other automated system to provide interaction with the user 102. Automated systems may include online systems and services that may be configured to interact with the user through the user interface unit 106.

In order to project the workspace 108 and to detect user actions with respect to the workspace 108, the user interface unit 106 may have a projector 112 and one or more imaging devices 114. The imaging devices may include optical or visual cameras, infrared cameras, and/or depth sensing devices. Accordingly, both two-dimensional and three-dimensional information may be available to the user interface unit regarding a visual scene that includes the workspace 108.

In the example of FIG. 1, the user interface unit 106 is positioned overhead, or above the user 102, in order to project the workspace 108 onto the surface 110. In other environments, the user interface unit 106 may be positioned across from a vertical display surface, such as for displaying content on a wall. In either of these situations, the face of the user 102 is typically directed toward the projected surface, and is therefore not visible to the user interface unit 106.

Although the user interface unit 106 is shown as an integrated unit, the components of the user interface unit 106 may also be discrete components that are located at different locations within a room. The various components and functionality attributed herein to the user interface unit 106 may communicate with each other using wired or wireless means, or may communicate with an overseeing component using similar means. In some embodiments, components that are described as being part of the user interface unit 106 may communicate over a local-area network.

In the example environment of FIG. 1, the second user 104 uses a conventional computer 116. The computer 116 includes an active display surface or device 118 such as an electronic monitor, flat-panel display, cathode ray tube, etc., on which a visual workspace 120 is displayed. The computer 116 may comprise any of various types of devices, including desktop computers, portable computers, personal media devices, communications devices, and so forth. In some cases, the computer 116 may comprise or utilize a user interface unit such as the user interface unit 106. In other words, both of the users 102 and 104 may in some embodiments use a user interface unit 106 that optically projects a collaborative workspace.

Selected content may be shared between the workspaces 108 and 120. In some situations, a content sharing program may be installed on or in conjunction with the user interface unit 106 and/or the computer 116 to provide content sharing. Various types of Internet or network-based services may also be used for this purpose. The user interface unit 106 and the computer 116 may communicate over a wide-area network (WAN) 122 such as the Internet. Other types of networks and communications techniques, including private and/or local-area networks, may also be used for this purpose.

The shared content may comprise text, documents, graphics, pictures, video, or combinations of the foregoing, which are displayed concurrently on the workspaces associated with various different users, and which in this example include the workspace 108 and the workspace 120. The shared content may originate or be generated from the user interface unit 106 and/or the computer 116. Alternatively, the shared content may originate from another source, such as a server or other network-based resource.

Capabilities may be provided for various types of collaborative interaction with the shared content, such as moving graphical pointers, selecting displayed objects, highlighting, editing, and other manipulations. On-screen manipulations and operations performed by one user with respect to the displayed content may be visible to other users on their respective display surfaces in real time. Capabilities may also be provided for audio and/or video conferencing among the users.

In the example of FIG. 1, the user interface unit 106 is capable of capturing video using the one or more imaging devices 114, and of transmitting the video to the second user 104. However, the user interface unit 106 may be located at a position above or behind the first user 102 and the face of the user 102 may not be directly visible to the user interface unit 106.

A mirror or reflector 124 is placed within the environment of the first user 102, positioned to reflect an image of the face of the first user 102 to the user interface unit 106. The user interface unit 106 is configured to detect the position of the mirror 124, to extract an image of the face of the first user 102 from the mirrored image, and to transmit the extracted image to the remote computer 116 for display to the second user 104 on the display surface 118 or workspace 120 of the second user 104. As an example, the extracted image may be displayed or overlaid as a pane or window 126, positioned over or alongside the shared content on the workspace 120.

Figure 2:
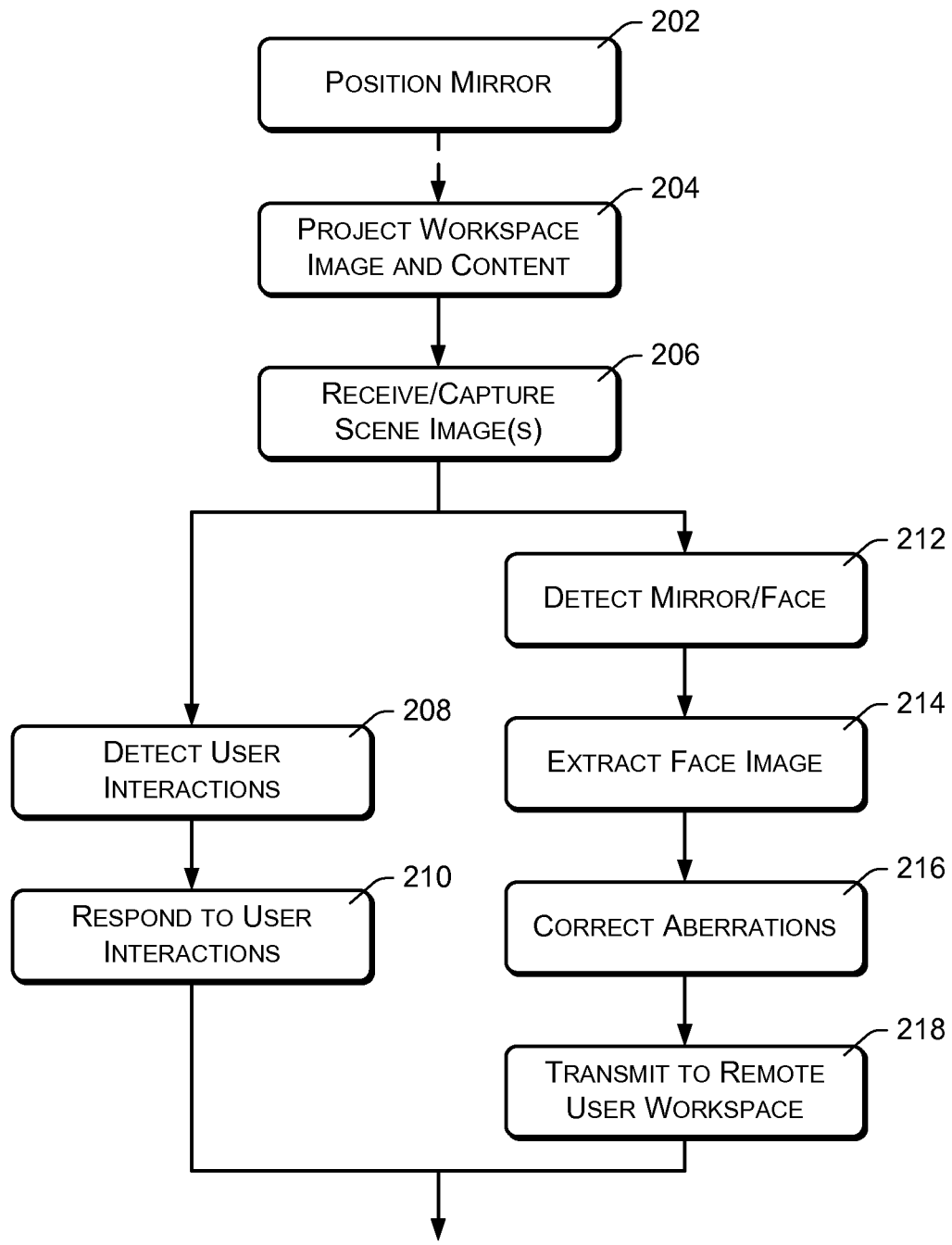
FIG. 2 is a flowchart illustrating a method of content sharing in which the face of a user viewing a projected workspace may be displayed on the display surface of another user.

FIG. 2 illustrates techniques for collaborating among users by sharing content and video. The techniques are described with reference to the environment of FIG. 1, although the described techniques may be used in other environments and situations. For example, the described techniques may be used for video conferencing applications in which at least one of the participants uses a projected workspace.

A preparatory action 202 comprises positioning a reflective surface such as the mirror 124 so that the surface reflects the face of the user 102 to the imaging components of the user interface unit 106. In the embodiment of FIG. 1, the mirror is positioned so that it rests on the display surface 110. The mirror may be positioned on, nearby or adjacent the workspace 108 and or the shared content. An image of the first user 102 as eventually extracted by the user interface unit 106 may be displayed as part of the workspace 108 by the user interface unit 106 to aid in properly aligning the reflective surface. In some embodiments, the mirror may have a motorized mounting arrangement, which may be associated with intelligent controls that position the mirror automatically to direct a reflection of the user's face to the user interface unit 106.

An action 204 comprises using a projector to project a graphic workspace and/or shared content on a first display surface associated with the first user 102, such as the passive display surface 110. In accordance with the discussion above, shared content is also displayed concurrently on one or more other display surfaces that are associated respectively with one or more other users, such as on the display surface 118 of the second user 104.

An action 206 comprises capturing or receiving one or more optical images from an optical camera, such an optical image from a camera of the user interface unit 106. The received images may encompass a scene within the environment of the first user that includes parts or all of the display surface, and which may include other parts of the user environment. In particular, the scene encompassed by the received image includes the mirror that has been positioned at or near the workspace 108, and therefore includes a mirrored image of the face of the user 102.

Images received in the action 206 may also include other types of images, including two-dimensional and three-dimensional images, to aid in detecting user movements and other conditions within the environment of the first user 102. The images may include infrared images, depth images, stereoscopic images, and so forth. The images may also include optical images taken from multiple cameras having different perspectives relative to the workspace 108.

An action 208, based on the images received in the action 206, comprises detecting hand-based interactions or gestures performed by the user over the display surface, including user gestures, movements, selections, and so forth. An action 210 comprises responding appropriately to the detected user interactions or gestures.

Also in response to or based on the images received in the action 206, an action 212 comprises detecting the reflective surface, such as the mirror 124, that has been positioned within the environment of the first user 102. This may be performed using two-dimensional optical analysis, such as by searching images of the environment for regions of high reflectivity that conform to a particular shape such as a square or rectangle. Alternatively, or in addition, three-dimensional techniques may be based on depth images to identify the mirror 124 based on its known shape and/or size.

The action 212 additionally, or alternatively, may comprise detecting the face of the user within the received images. This may be performed using facial recognition techniques, without specifically attempting to detect the location of the mirror.

An action 214 comprises extracting an image of the face of the first user 102 from one or more of the images received in the action 206. The action 214 may be based on the detected position of the mirror 124 or on the detected location of the face of the user within the received image or images.

An action 216 comprises correcting any existing aberrations in the extracted image that may have been caused by the reflection of the mirror 124 or by characteristics of the mirror 124. For example, aberrations may include image reversals and keystone effects, which may be corrected by appropriate image processing. In some cases, as will be described in more detail below, the mirror 124 may be non-planar, which may introduce distortions into the extracted image based on the non-planar shape of the mirror. Such distortions may also be corrected by appropriate image processing.

An action 218 comprises transmitting the extracted and corrected image to a remote user or device for displaying the face of the first user in conjunction with the shared content on the display surface of the second user 104.

The actions of FIG. 2, starting with the action 204, are performed repeatedly or continuously in order to obtain and provide a moving image or video of the face of the first user for viewing by the second user.

Although the techniques described above are discussed in the environment of two users and associated display surfaces, the techniques may be similarly used with any number of users and computing devices that are configured to share content. The techniques may also be used for different purposes, apart from content sharing. For example, the described techniques may be used for video conferencing in conjunction with a projection-based user interface.

Figure 3:
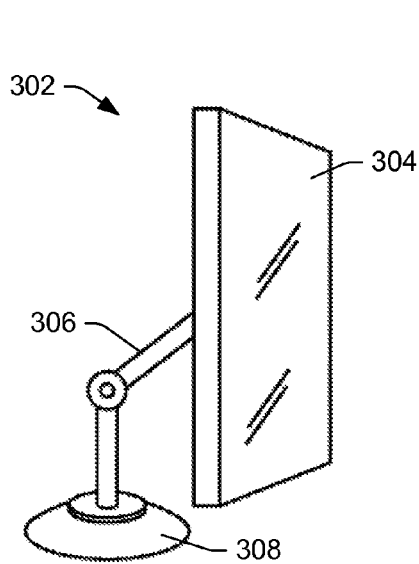
FIGS. 3-5 are diagrams showing examples of different types of mirrors that may be used in environments such as that of FIG. 1 to allow viewing of the face of a user.
Figure 4:
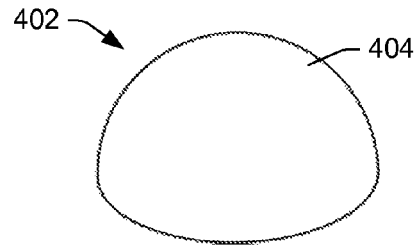
Figure 5:
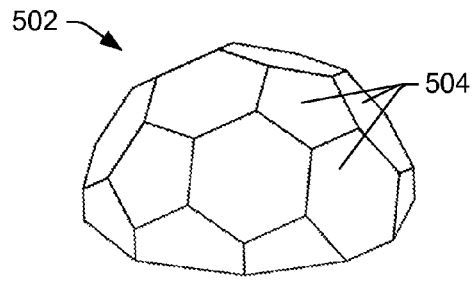

FIGS. 3-5 show examples of different mirrors or reflective surfaces that may be used in conjunction with the techniques described above to reflect an image of a user to a user interface unit that may not otherwise have a direct line of sight to the face of the user.

FIG. 3 shows an example of a mirror 302 having a single planar reflective surface 304. The reflective surface 304 is mounted on an articulated arm 306, which extends from a base 308 that is configured to rest on a surface such as the tabletop of FIG. 1.

FIG. 4 shows an example of a mirror 402 having a non-planar reflective surface 404. In this example, the reflective surface 404 has a semi-spherical shape, which may be used to produce or obtain a wide-angle view of the surrounding area. Although the non-planar shape distorts any image reflected to the user interface unit 106, the distortion can be corrected by image processing, based on a-priori knowledge of the shape of the mirror 402 or upon detecting the shape of the mirror 402.

FIG. 5 shows an example of a mirror 502 having multiple facets 504, which in this example comprise planar surfaces. Each facet 504 is directed in a different direction, and is therefore capable of reflecting a different part of the user's environment to the user interface unit 106. The user interface unit 106 may use facial recognition techniques to determine which of the facets is reflecting the face of the user.

Figure 6:
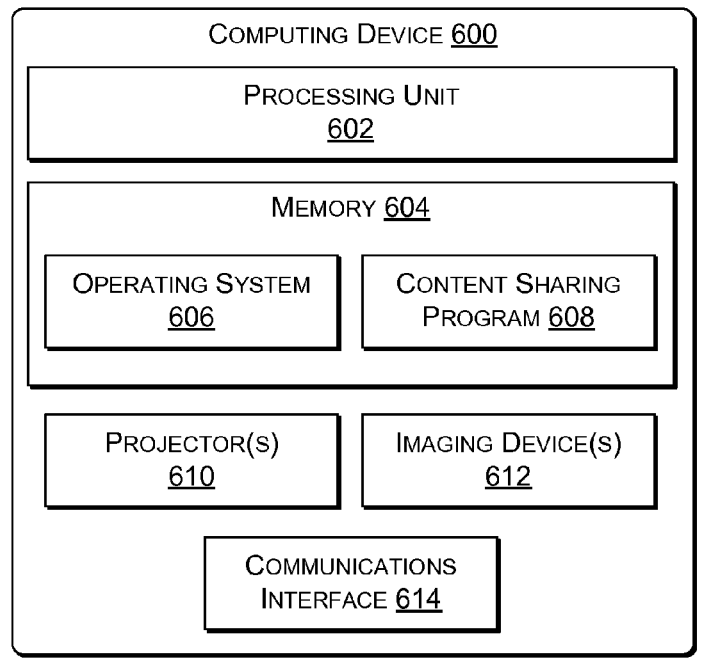
FIG. 6 is a block diagram illustrating an example configuration of a user interface unit or collaborating computer that may be used in conjunction in environments such as that illustrated by FIG. 1.

FIG. 6 illustrates relevant components of a computing device 600 that may be used to implement the functionality described above, and in particular to implement the user interface unit 106. In a very basic configuration, an example computing device 600 might comprise a processing unit 602 composed one of one or more processors, and memory 604. The memory 604 may comprise computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the computing device 600.

The techniques described above are assumed in the given examples to be implemented in the general context of computer-executable instructions or software, such as program modules, that are stored in the memory 604 and executed by the processing unit 602. Generally, program modules include routines, programs, objects, components, data structures, etc., and define operating logic for performing particular tasks or implementing particular abstract data types.

Thus, the memory 604 may store an operating system 606 as well as components, modules, and/or logic for performing the actions described above. For example, the memory 604 may contain a content sharing program 608, which may be configured to perform or implement the functionality described above.

The computing device 600 has a projector 610, which may be used to display content on a passive display surface as described above. The projector 610 may have various capabilities, including the ability to zoom, pan, rotate, and so forth, in order to adapt to different environmental conditions and different types of display surfaces.

The computing device 600 may also have one or more imaging devices 614, which may include optical cameras, depth sensors, and other types of sensors capable of providing information regarding environmental conditions including optical and physical properties of users and objects within an environment.

The computing device 600 may also have a communications interface 614, such as a wired or wireless network interface, for communicating with other computing devices. For example, the communications interface 614 may comprise an Ethernet adapter for communications over common communications networks.

The computing device 600 may of course include many other logical, programmatic, and physical components, of which those shown in FIG. 6 are merely examples that are related to the discussion herein. Thus, the computing device 600 may include various other communications interfaces, storage devices, input/output components, and so forth.

Although the discussion above sets forth an example implementation of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances. In some embodiments, parts of the functionality described above may be provided or supported by network-accessible servers or services.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A workspace collaboration system comprising:
a processor;
an optical camera;
a projector;
memory, accessible by the processor and storing instructions that are executable by the processor to perform acts comprising:
projecting, with the projector, content on a first display surface associated with a first user, wherein the content is shared for display on one or more other displays or display surfaces that are associated respectively with one or more other users;
receiving a first image from the optical camera of an area that includes at least a portion of the first display surface and a reflector having known dimensions that is positioned to reflect a face of the first user to the optical camera;
analyzing the first image to detect a portion of the first image corresponding to the reflector based at least in part on the known dimensions;
extracting a second image that includes the face of the first user from the detected portion of the first image; and
providing the second image for use in displaying the face of the first user in conjunction with the shared content on the one or more other displays or display surfaces.

2. The system of claim 1, the acts further comprising:
analyzing the first image to detect hand-based gestures performed by the first user over the first display surface; and
responding to the hand-based gestures.

3. The system of claim 1, further comprising a depth sensor that provides depth information corresponding to the area of the first image, wherein analyzing the first image to detect the portion of the first image corresponding to the reflector is based at least in part on the depth information provided by the depth sensor.

4. The system of claim 1, wherein the known dimensions of the reflector comprises a particular shape or a particular size of the reflector.

5. The system of claim 1, wherein the reflector comprises a non-planar reflective surface and the acts further comprise processing the second image to correct distortions caused by the non-planar reflective surface of the reflector.

6. A method, comprising:
projecting content onto a first display surface associated with a first user, wherein the content is shared for display on one or more other displays or display surfaces that are associated respectively with one or more other users;
receiving a first image of an area that includes at least a portion of the first display surface and a reflector that is positioned to reflect a face of the first user;
extracting a second image that includes the face of the first user from the first image;
processing the second image to correct one or more aberrations in the second image caused by the reflector; and
providing the processed second image for use in displaying the face of the first user in conjunction with the shared content on the one or more other displays or display surfaces.

7. The method of claim 6, further comprising:
analyzing the first image to detect hand-based gestures performed by the first user over the first display surface; and
responding to the hand-based gestures.

8. The method of claim 6, further comprising:
receiving depth information corresponding to the area of the first image; and
detecting a position of the reflector within the first image based at least in part on the received depth information.

9. The method of claim 6, wherein the extracting comprises detecting a position of the face of the first user in the first image using facial recognition.

10. The method of claim 6, wherein processing the second image to correct the one or more aberrations in the second image caused by the reflector comprises correcting at least one of an image reversal, a keystone effect, or a distortion caused by a dimension of the reflector.

11. The method of claim 6, wherein the reflector comprises a non-planar reflective surface, the method further comprising processing the second image to correct a distortion caused by the non-planar reflective surface of the reflector.

12. One or more non-transitory computer-readable media storing computer-executable instructions that, when executed by one or more processors, cause the one or more processors to perform acts comprising:
projecting content onto a display surface that is associated with a first user;
receiving a first image of an area that includes a non-planar reflector positioned to reflect a face of the first user, wherein the first user is positioned to view the projected content;
extracting a second image that includes the face of the first user from the first image of the area that includes the non-planar reflector; and
providing the second image for use in displaying the face of the first user on a display or display surface associated with a second user.

13. The one or more non-transitory computer-readable media of claim 12, the acts further comprising:
analyzing the first image to detect hand-based gestures performed by the first user over the display surface; and
responding to the hand-based gestures.

14. The one or more non-transitory computer-readable media of claim 12, the acts further comprising sharing the content between multiple users.

15. The one or more non-transitory computer-readable media of claim 12, wherein the reflector is positioned on the display surface.

16. The one or more non-transitory computer-readable media of claim 12, wherein the reflector is positioned adjacent to the projected content.

17. The one or more non-transitory computer-readable media of claim 12, the acts further comprising:
receiving depth information corresponding to the area of the first image; and
detecting a position of the reflector within the first image based at least in part on the depth information.

18. The one or more non-transitory computer-readable media of claim 12, wherein the extracting comprises detecting a position of the face of the first user in the first image using facial recognition.

19. The one or more non-transitory computer-readable media of claim 12, the acts further comprising processing the second image to correct one or more aberrations in the second image caused by the reflector.

20. The one or more non-transitory computer-readable media of claim 12, wherein the reflector comprises a non-planar reflective surface, the acts further comprising processing the second image to correct distortions caused by the non-planar reflective surface of the reflector.

21. The system of claim 1, wherein the reflector further comprises a mounting arrangement to automatically position the reflector based at least in part on a location of the face of the first user.

\* \* \* \* \*